United States Patent [19]
Bittner

[11] Patent Number: 5,640,617
[45] Date of Patent: Jun. 17, 1997

[54] CAMERA SHUTTER AND AUTOFOCUS MECHANISM

[75] Inventor: Wilfried A. A. Bittner, Hong Kong, Hong Kong

[73] Assignee: W. Haking Enterprises Limited, Hong Kong

[21] Appl. No.: 732,634

[22] Filed: Oct. 16, 1996

[30] Foreign Application Priority Data

Oct. 24, 1995 [GB] United Kingdom ............. 9521803

[51] Int. Cl.[6] .................... G03B 3/00; G03B 9/02; G03B 9/10
[52] U.S. Cl. .................... 396/90; 396/401; 396/443; 396/493; 396/502; 396/505
[58] Field of Search .................... 396/72, 90, 401, 396/402, 387, 443, 502, 505, 493

[56] References Cited

FOREIGN PATENT DOCUMENTS

| 2004658 | 4/1979 | United Kingdom . |
|---|---|---|
| 2064798 | 6/1981 | United Kingdom . |

OTHER PUBLICATIONS

Examiner's Search Report of 16 Nov 1995 in Convention Priority Appln. British # 9521803.8, filed Oct. 24, 195.

Primary Examiner—W. B. Perkey
Attorney, Agent, or Firm—Mason, Kolehmainen, Rathburn & Wyss

[57] ABSTRACT

A camera includes a film drive motor, that connected through a series of gears, drives a bi-directional moving control element. The moving control element is, in turn, mechanically linked to a shutter striker, shutter striker release mechanism, lens focus mechanism and aperture control mechanism. The film drive motor also drives a film advance gear mechanism and a film rewind gear mechanism. Under the control of an electronic control system, by selectively changing the rotation direction of the film advance motor, and hence the direction of travel of the moving control element, the moving control element is first driven in the forward direction to sequentially move a shutter striker to a cocked position and then to set a preferred picture taking position for the lens focusing mechanism and an aperture control mechanism. The moving control element is then driven in the reverse direction to, in sequence, release the shutter striker to take a picture at the preferred picture taking position for the lens focusing mechanism and aperture control mechanism, reset the lens focusing mechanism and the aperture control mechanism, and forward wind the film to the next picture taking position.

7 Claims, 16 Drawing Sheets

FIG. 6
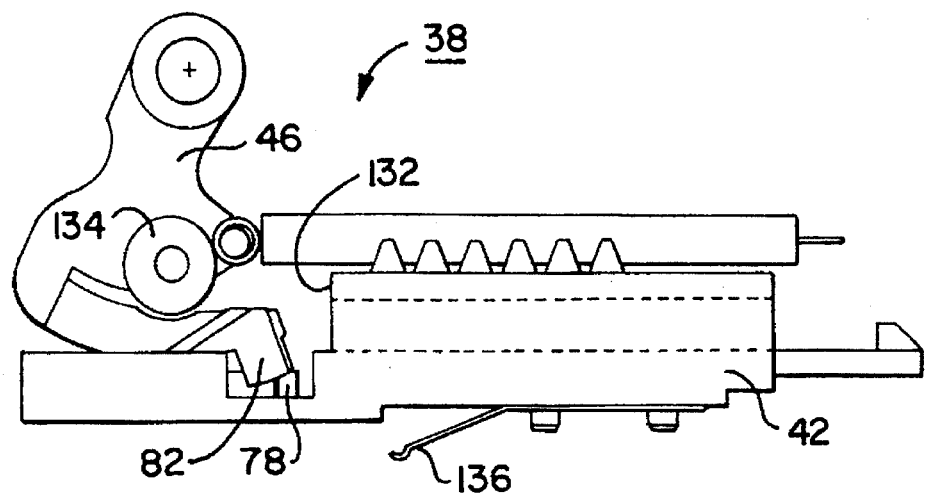
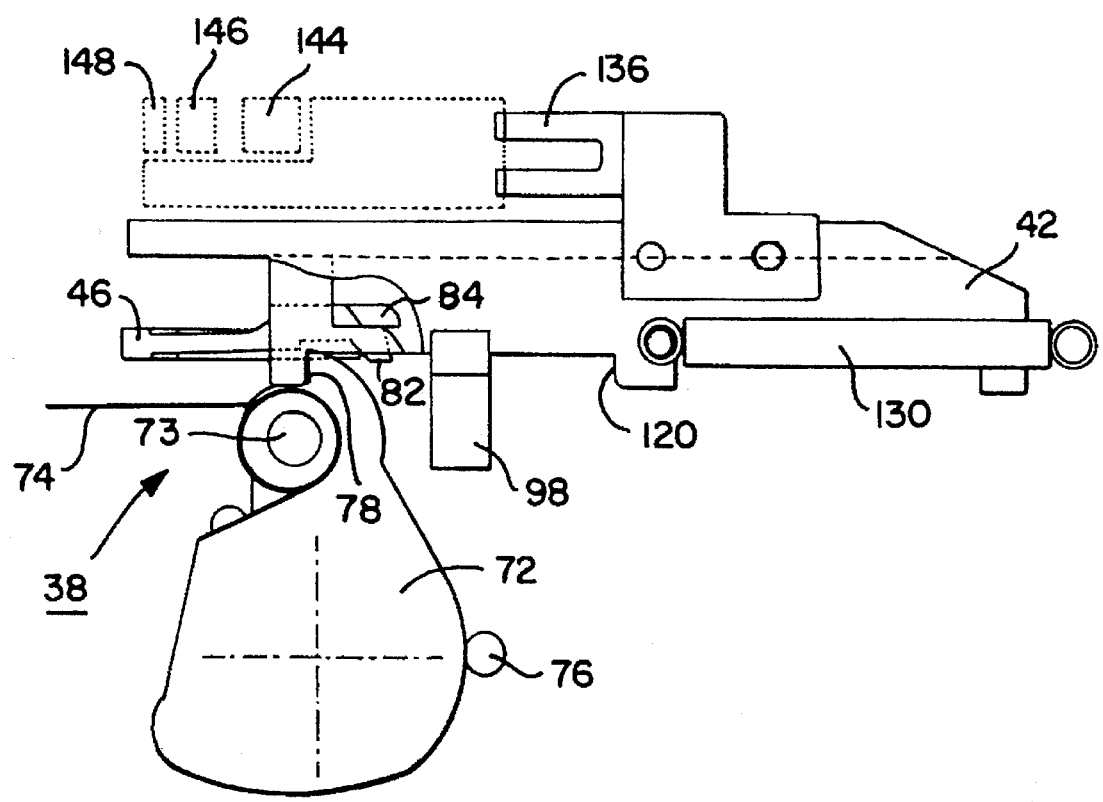
FIG. 5

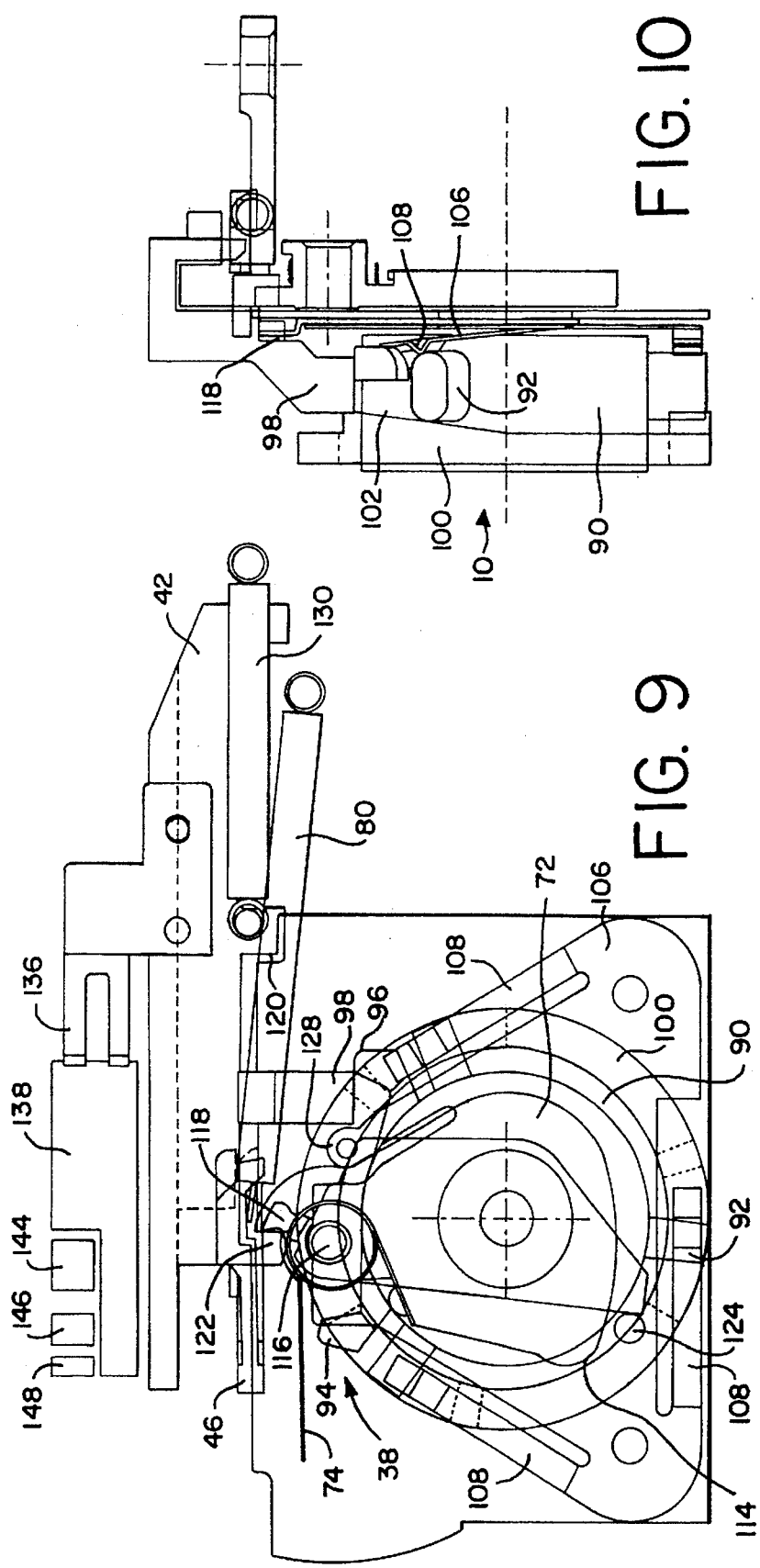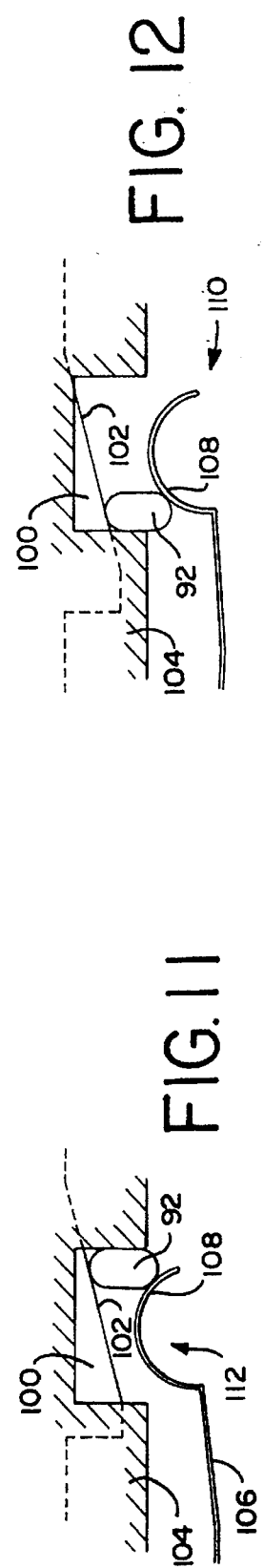

FIG. 14
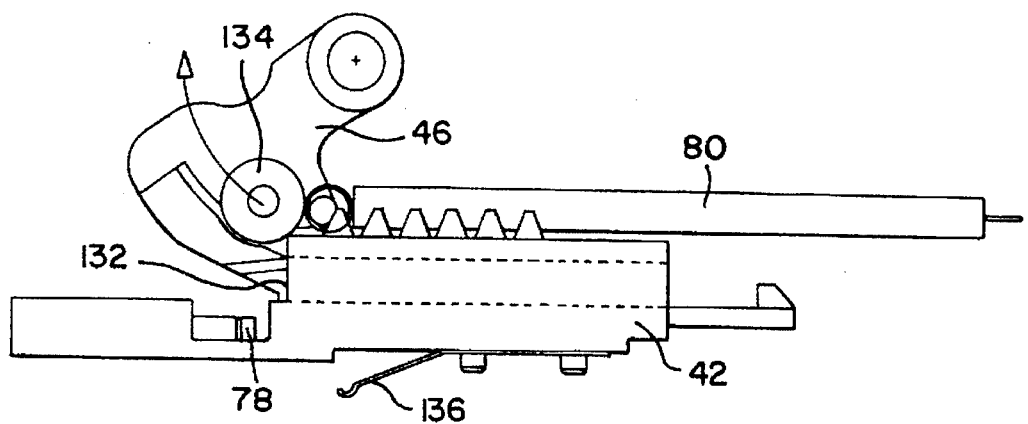
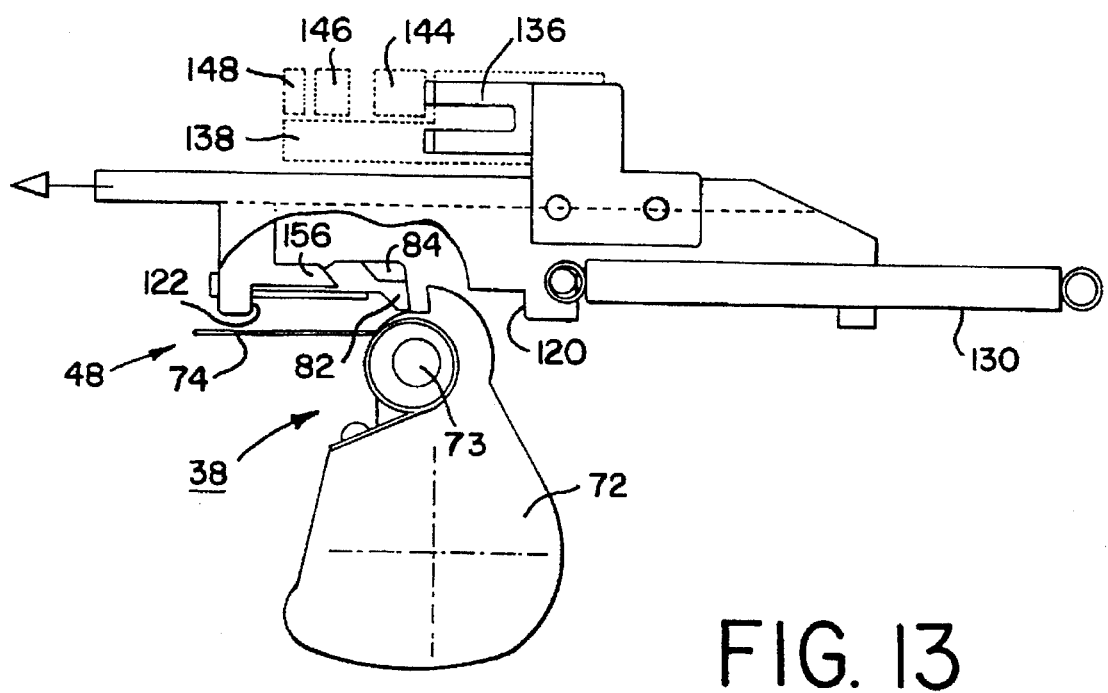
FIG. 13

FIG. 18
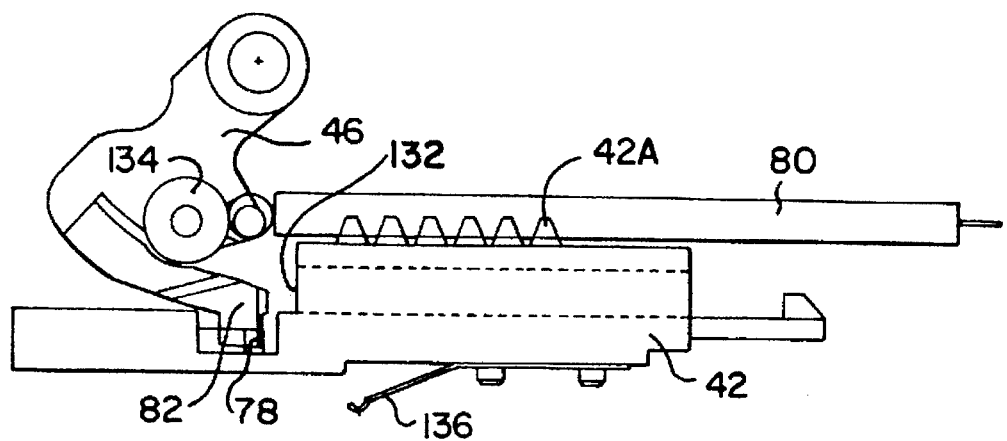
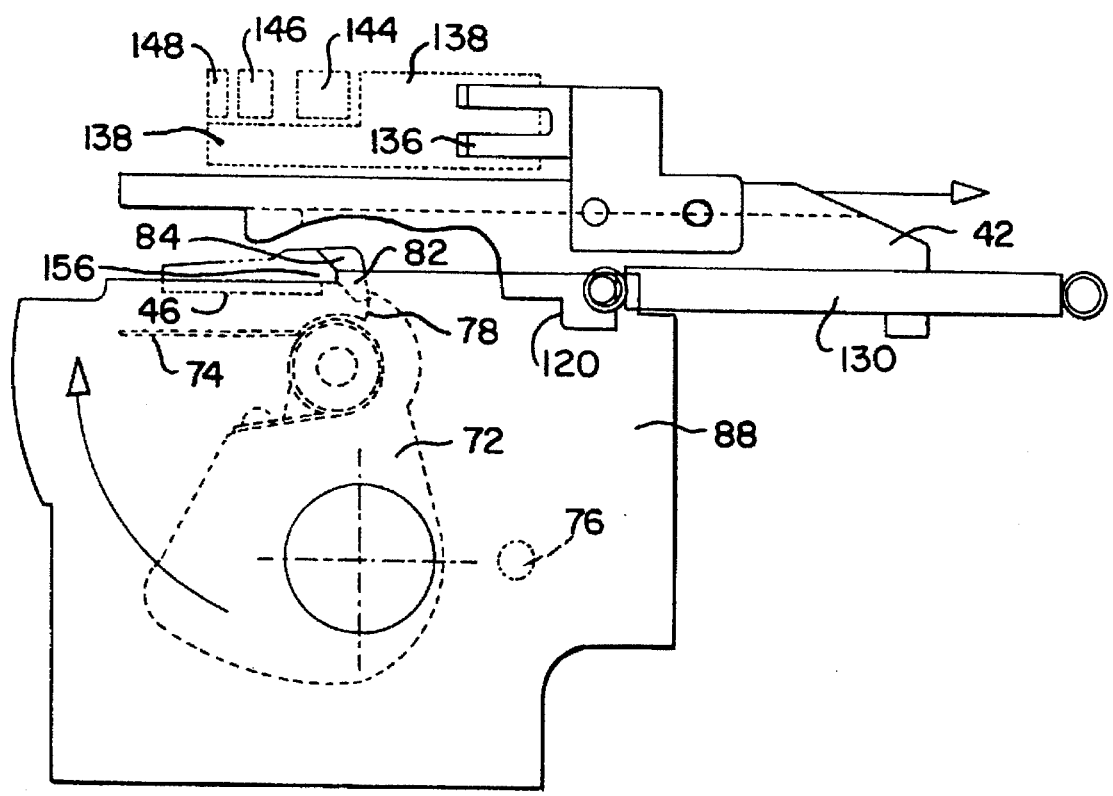
FIG. 17

FIG. 20
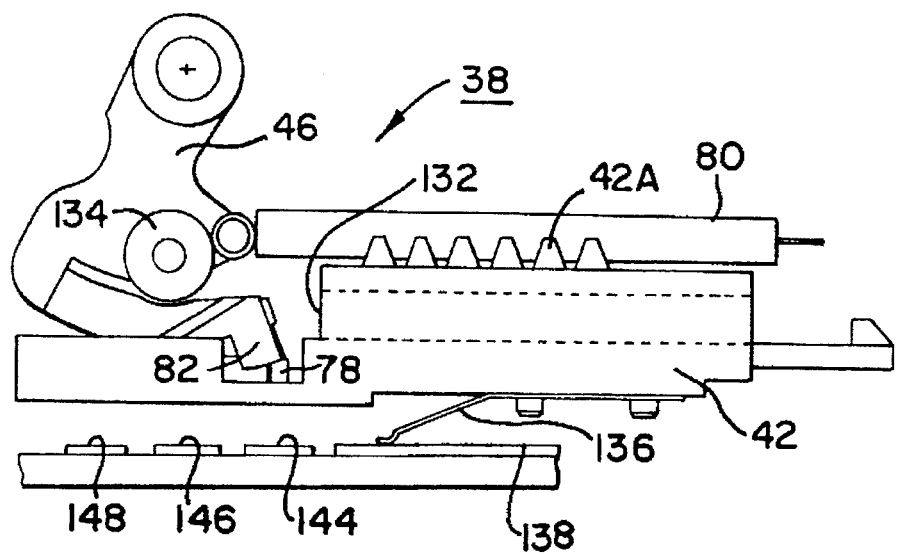
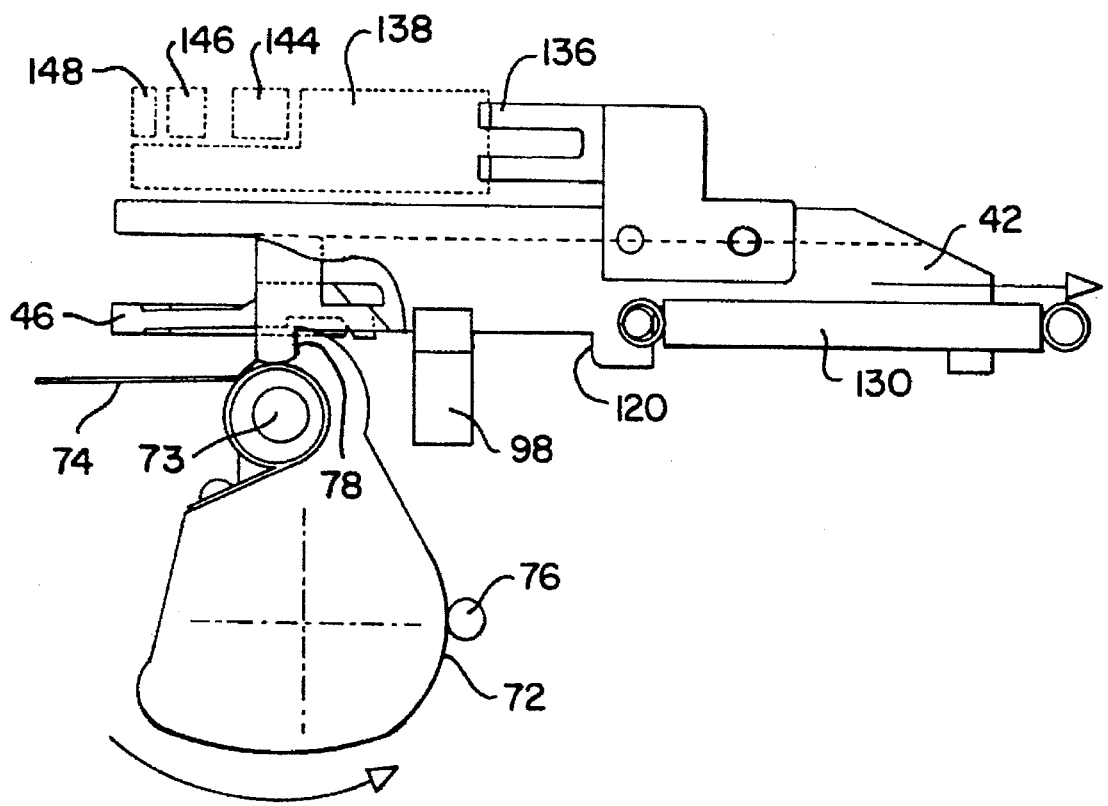
FIG. 19

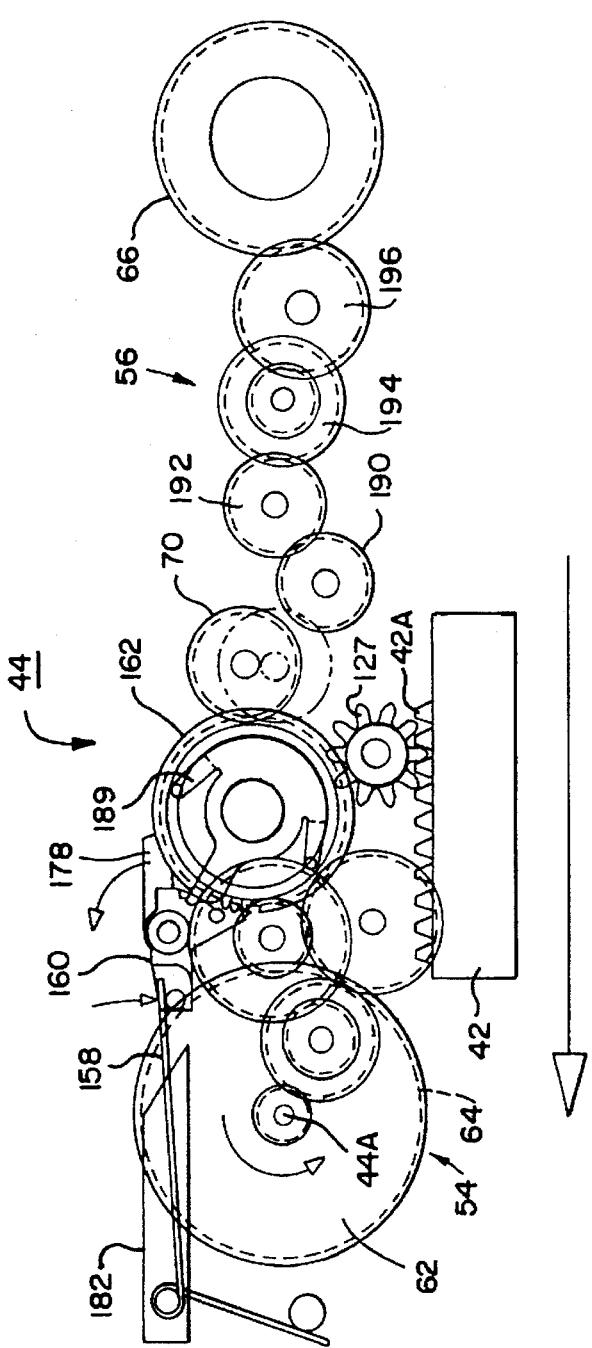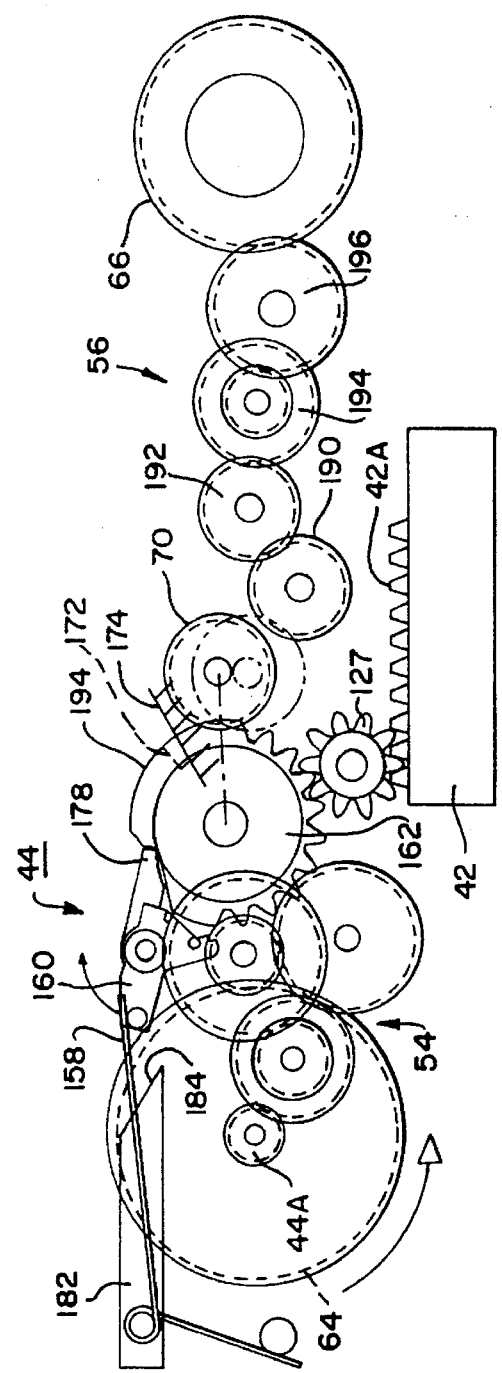

FIG. 26B
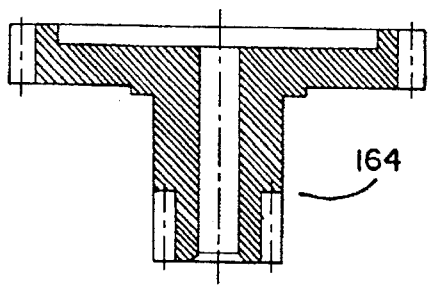
FIG. 26A
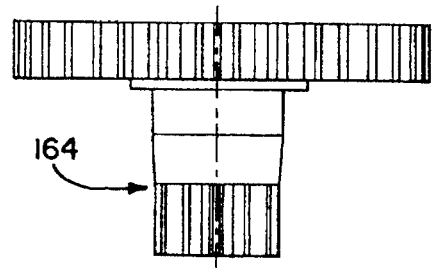
FIG. 26C
FIG. 26D
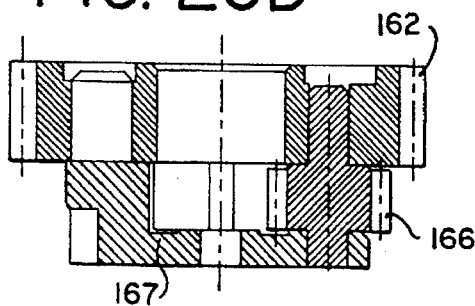
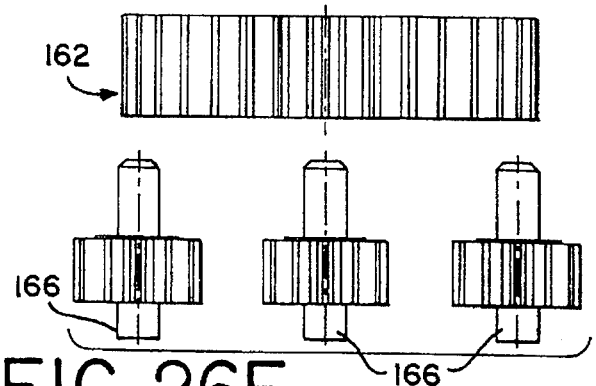
FIG. 26E
FIG. 26F
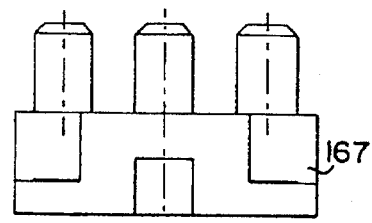
FIG. 26G
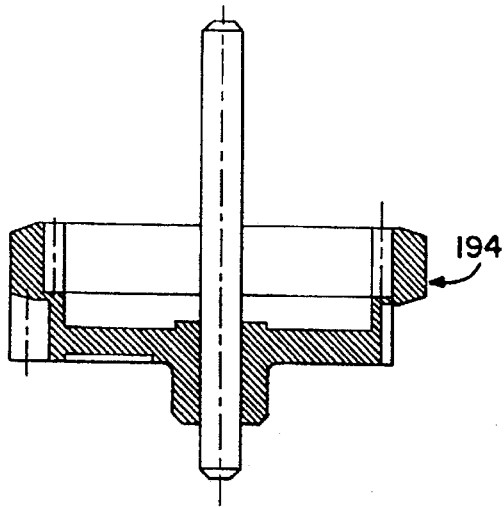
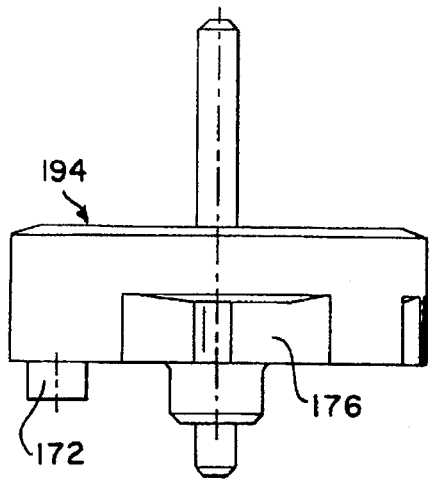
FIG. 26H

CAMERA SHUTTER AND AUTOFOCUS MECHANISM

FIELD OF THE INVENTION

The present invention relates to cameras, and more particularly to an improved shutter and autofocus mechanism for a camera.

DESCRIPTION OF THE PRIOR ART

Motorized film transport systems used in prior art cameras frequently are mechanically linked to the camera shutter and incorporate a mechanism for storing energy which can be used for opening and closing a camera shutter.

A shutter design frequently used in such prior art cameras typically employs a mechanical device called a striker which can be moved between a ready or cocked position and a released position. This movable striker is mechanically linked to and is driven by the film advance mechanism. During film advance, after taking a picture, the film advance mechanism causes the striker to move from the released position to the ready (cocked) position. A spring, coupled to the striker, is compressed during this movement. Typically, in such a camera, the striker is held in the cocked position by a mechanism that is mechanically linked to the camera's shutter release button. When the camera user presses a shutter release button to take a picture, the movement of the shutter release button is mechanically transferred to the striker's locking mechanism causing the striker to be released and to be propelled by the released force of the compressed spring, against a movable shutter blade or blades. The kinetic energy of the moving striker is transferred to the shutter blades causing them to open. Typically a spring will be connected to the shutter blades to return them to the closed position after a brief exposure period. Such a coupled shutter and film advance system is simple and inexpensive to manufacture.

A disadvantage of the above mechanism is that a mechanical input force is required to unlock the striker (mechanically linked to the shutter release button) and initiate a picture taking sequence. Many features that are considered desirable by camera users and manufacturers can only easily be implemented if the shutter can be released by input of an electrical signal to the shutter mechanism. Examples of such desirable features are an electronic self timer where the shutter fires after a 10 second time delay allowing self portraits and an electronic remote control where the user controls a distant camera by using a remote shutter release. Other examples include a soft touch shutter release button where the shutter release button is an electrical switch so that only a small force and short button travel distance are required for taking a picture; and a red-eye reduction system where an effective prior art red-eye reduction system requires a light source in the camera to be directed into the subjects' eyes followed by shutter actuation and electronic flash actuation after a predetermined precise time delay.

In prior art cameras such as described above, a solenoid or other electromechanical device could be used to convert an electrical input signal into the mechanical force required to release the shutter striker. Such devices are well known in the prior art but add undesirable expense and size to the camera construction.

There are also prior art cameras that use a stepper motor, a solenoid or other electromechanical device to directly control the opening and closing of the shutter, eliminating the need for a mechanical striker linked to the film advance mechanism, as described above. Such shutter designs are typically much more expensive and difficult to manufacture than the mechanical shutter system described above.

There are also prior art cameras using the coupled mechanical shutter and film advance system described above that also have one or more additional mechanisms coupled to the film advance in order to control the movement of a lens holder for automatic focusing. Typically the lens focusing position can be changed by varying the rotation angle of the lens holder. By changing the rotation angle of the lens, the lens can be focused either for distant subjects or for close subjects. Typically in such prior art cameras, the rotation of the lens is coupled to the movement of the shutter striker. When the striker moves from a released position to a cocked position, the lens holder is also rotated from a released position to a cocked position. Typically the cocked position may represent one desired focus position, and the released position will represent a second desired focus position. An electronic system within the camera will typically detect subject distance and will predetermine which focus position will give better pictures. When the shutter striker is released, a solenoid is typically used to either hold the lens holder in the cocked position preventing it from rotating when the shutter opens or to release the lens holder allowing it to be in the released position when the shutter opens.

In other prior art cameras, a stepper motor, a solenoid or other electromechanical device may be used to directly move the lens to the desired focus position, eliminating the need for a mechanical linkage to the film advance or shutter system.

In both types of prior art camera, the stepper motor, solenoid or other electromechanical device adds undesirable expense to the camera construction.

A further enhancement to prior art cameras using the coupled mechanical shutter and film advance system described above is to have one or more additional mechanisms coupled to the film advance in order to control the movement of an aperture plate or aperture blades for changing film exposure levels for different lighting conditions or different film speeds. Typically the lens aperture may be changed by moving a mechanism located behind the lens. The moving mechanism has one or more aperture holes or adjustable aperture blades that correspond to desired lens apertures. Typically in such prior art cameras, the movement of the aperture mechanism is coupled to the movement of the shutter striker. When the striker moves from a released position to a cocked position, the aperture mechanism is also moved from a released position to a cocked position. Typically the cocked position may represent one desired lens aperture, and the released position will represent a second desired lens aperture. An electronic system within the camera will typically detect lighting condition or film speed and will predetermine desired lens aperture for better pictures. When the shutter striker is released, a solenoid may be typically used to either hold the lens aperture mechanism in the cocked position preventing it from moving when the shutter opens or to release the lens aperture mechanism allowing it to be in the released position when the shutter opens.

In other prior art cameras, a stepper motor, a solenoid or other electromechanical device may be used to directly change the lens aperture to the desired size, eliminating the need for a mechanical linkage to the film advance or shutter system.

In both types of prior art camera, the stepper motor, solenoid or other electromechanical device adds undesirable expense to the camera construction.

SUMMARY OF THE INVENTION

Important objects of the present invention are to provide an improved camera and shutter and autofocus mechanism; to provide an improved mechanism for a motorized film transport mechanism which allows additional automatic camera functions, such as electronic controlled shutter release, multiple automatic exposure settings, and multiple automatic focus settings to be mechanically driven and selectively controlled by the film transport motor without requiring additional electromechanical devices; to provide a film advance system that can use an available film advance motor as an electromechanical device to release the shutter upon receipt of an electronic shutter release input signal without requirement for additional electromechanical devices; to provide an improved mechanism for electronic selection of one or more focus settings or one or more aperture selections using the same film advance mechanism without requirement for additional electromechanical devices other than the film advance motor; and to provide a camera, shutter and autofocus mechanism overcoming disadvantages of cameras, shutters and autofocus mechanisms used in the past.

In brief, in accordance with the present invention there is provided a camera including a film advance drive motor for driving a film advance mechanism and a film rewind mechanism. A moving control element is coupled to the film advance drive motor for moving from a first position to a plurality of sequential positions along a predefined path. Shutter tripping is operatively coupled to the moving control element to take a picture. The moving control element is coupled to a lens focusing mechanism and an aperture control mechanism. Focus position and aperture are controlled by the film advance drive motor and the moving control element to set preferred picture taking positions.

BRIEF DESCRIPTION OF THE DRAWING

The present invention together with the above and other objects and advantages may best be understood from the following detailed description of the preferred embodiments of the invention illustrated in the drawings, wherein:

FIG. 5 is a front plan view of a shutter mechanism and the moving control element of the camera of FIG. 1 shown in a starting position;

FIG. 6 is a top plan view of the shutter mechanism and the moving control element of the camera of FIG. 1 shown in the starting position;

FIG. 9 is a combined front plan view illustrating the shutter mechanism, the lens focusing control mechanism, the aperture control mechanism and the moving control element of the camera of FIG. 1;

FIG. 10 is a side view illustrating the lens focusing control mechanism of the camera of FIG. 1;

FIGS. 11 and 12 are details illustrating near and far focusing positions of the lens focusing control mechanism of the camera of FIG. 1;

FIG. 13 is a front plan view of a shutter mechanism and the moving control element of the camera of FIG. 1 showing movement during a cocking process;

FIG. 14 is a top plan view of the shutter mechanism and the moving control element of the camera of FIG. 1 showing movement during a cocking process;

FIG. 17 is a front plan view of a shutter mechanism and the moving control element of the camera of FIG. 1 showing movement during an open shutter step;

FIG. 18 is a top plan view of the shutter mechanism and the moving control element of the camera of FIG. 1 showing movement during an open shutter step;

FIG. 19 is a front plan view of the shutter mechanism and the moving control element of the camera of FIG. 1 shown in a finished position;

FIG. 20 is a top plan view of the shutter mechanism and the moving control element of the camera of FIG. 1 shown in a finished position;

FIG. 22 is a gear train schematic top plan view illustrating the shutter cocking sequence;

FIG. 23 is a gear train schematic top plan view illustrating a shutter triggering sequence;

FIGS. 26A–26H are views illustrating a planetary gear assembly of the camera of FIG. 1.

DETAILED DESCRIPTION OF THE PREFERRED EMBODIMENTS

Figure 1:
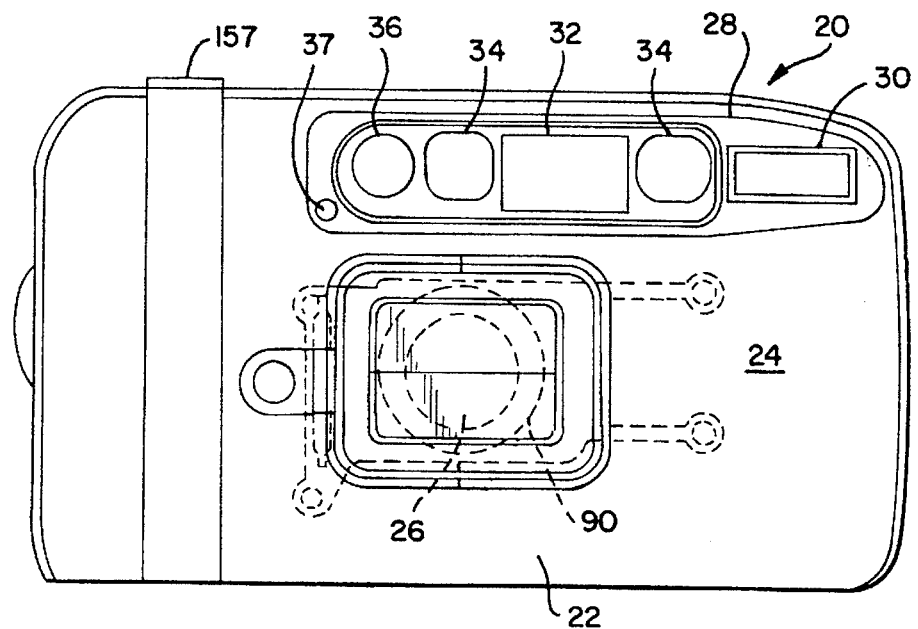
FIG. 1 is a front view of a camera having a shutter and autofocus mechanism constructed in accordance with the present invention.
Figure 2:
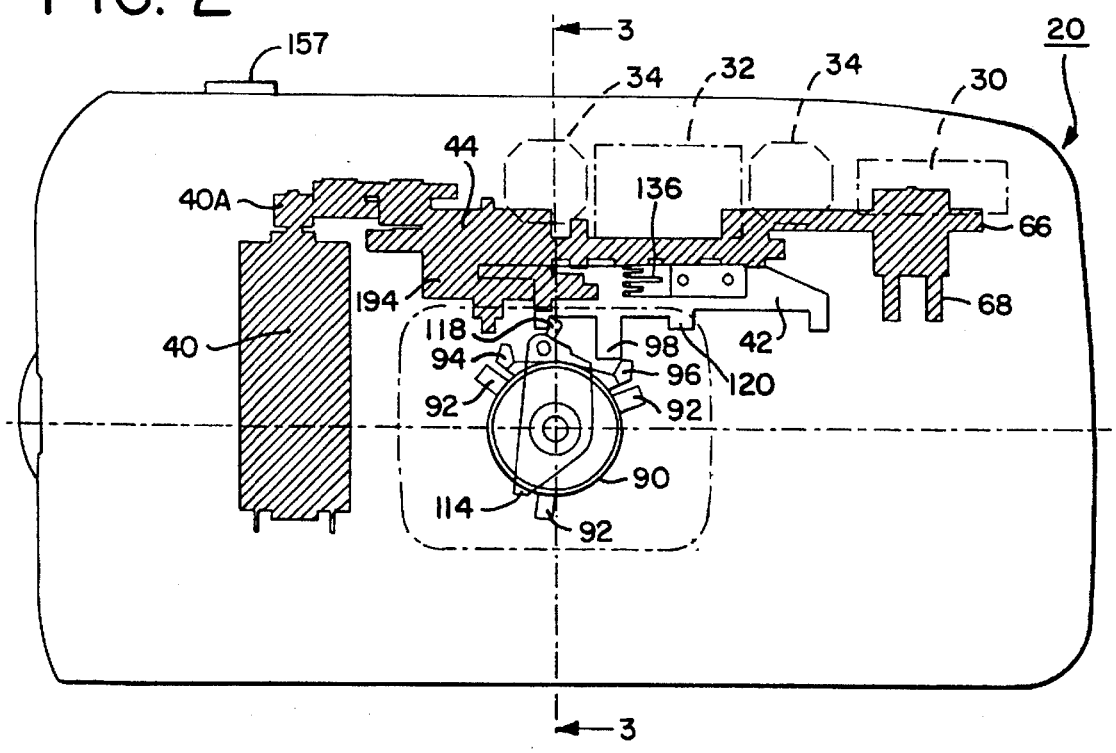
FIG. 2 is an enlarged view like FIG. 1 showing components of the shutter and autofocus mechanism of the camera of FIG. 1.
Figure 3:
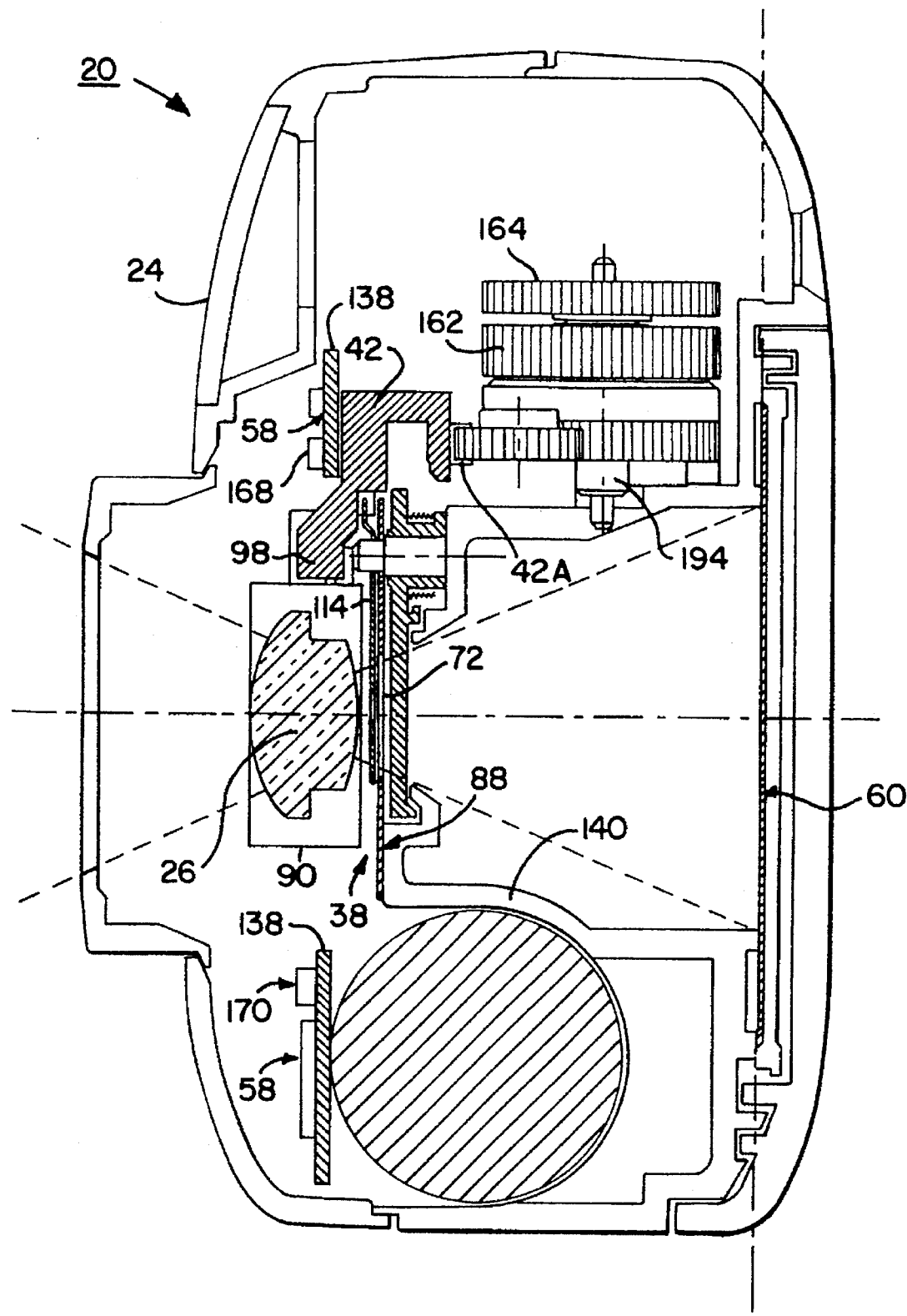
FIG. 3 is a diagrammatic vertical sectional view of the camera of FIG. 1 taken along the line 3—3 of FIG. 2.

Having reference now to the drawings, and initially to FIGS. 1–3, there is illustrated a camera generally designated as 20. The camera 20 includes a housing 22 with a front wall surface 24. Camera 20 is of a compact size, with a small front to back thickness. A lens unit 26 is located near the front surface 24 of the housing 22. Except as described below, the camera 20 may be of any desired conventional construction and may include an array 28 of elements such as a flash 30, a view finder 32, a range finder 34, an illuminator 36 for red-eye reduction and an ambient light level sensor 37.

In accordance with the present invention the camera 20 is provided with a shutter mechanism generally designated by 38 (FIGS. 3, 5, 13, 15–17 and 19). A film drive motor 40 is drivingly connected to a bi-directional moving control element or plate 42 through a series of gears including a planetary gear assembly 44 illustrated in FIGS. 4 and 26A-26H. The control plate 42 is, in turn, mechanically linked to a shutter striker 46 (FIGS. 5, 6 and 14), a shutter striker release mechanism 48 (FIGS. 13, 15 and 16), a lens focusing mechanism 50 (FIGS. 7 and 10) and an aperture control mechanism 52 (FIG. 8). The film drive motor 40 also drives a film advance gear mechanism 54 and a film rewind gear mechanism 56 (FIGS. 4, 22 and 23).

Under the control of an electronic control system 58, by selectively changing the rotation direction of the film advance motor 40, and hence the direction of travel of the control plate 42, the control plate 42 is first driven in the forward direction to sequentially move the shutter striker 46 to a cocked position and then, if necessary, to set a preferred picture taking position for the lens focusing mechanism 50 and/or the aperture control mechanism 52. The control plate 42 is then driven in the reverse direction to, in sequence, release the shutter striker 46 to take a picture at the preferred picture taking position for the lens focusing mechanism 50 and aperture control mechanism 52, and if necessary, reset the lens focusing mechanism 50 and the aperture control mechanism 52, and forward wind the film to the next picture taking position.

Figure 4:
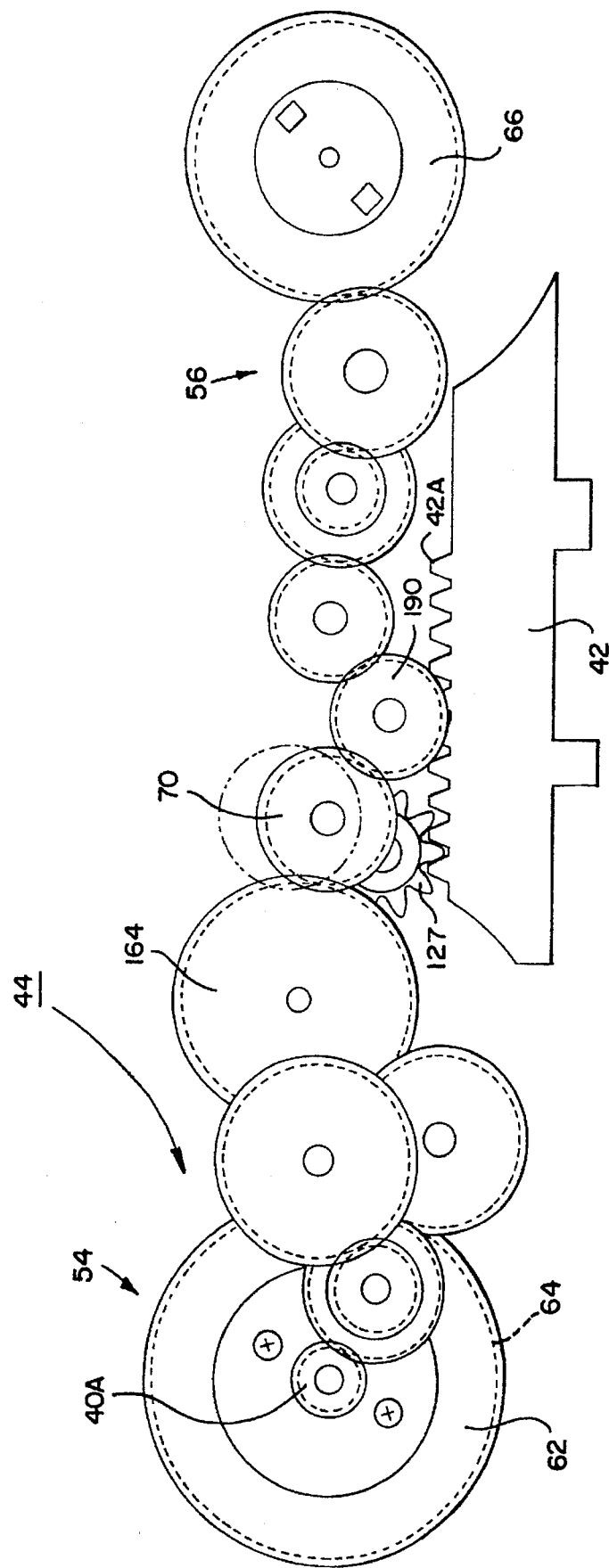
FIG. 4 is a diagrammatic top plan view of a gear train and a moving control element of the camera of FIG. 1.

Referring also to FIG. 4, a motor pinion 40A is connected through the planetary gear assembly 44 to a spool gear 62. The spool gear 62 is directly coupled to a film take-up spool 64. A rewind gear 66 and a rewind fork 68 attached to the rewind gear 66 are also attached to the motor 40 through the planetary gear assembly 44 and a swing gear 70. The swing gear 70 is selectively moved into or out of engagement with the gear train to engage or disengage the rewind gear 66 from the planetary gear assembly 44 and motor 40.

Referring also to FIGS. 5 and 6, a shutter blade 72 is located in the optical path between the lens 26 and a film exposure plane 60 (FIG. 3) to control the amount of image exposure time. The shutter blade 72 rotates about a pivot axis 73 and is biased by a shutter spring 74 to rotate in a counterclockwise direction against a shutter stop pin 76. The shutter blade 72 has a striking surface 78 located in a radial direction above the pivot axis 73 of shutter blade 72.

The shutter striker 46 rotates about its pivot axis in a plane perpendicular to that of the shutter blade 72. The shutter striker 46 is spring biased by a striker spring 80 to rotate in a counterclockwise direction. The shutter striker 46 has a flexible arm which has both a striking pawl 82, which can contact the striking surface 78 of the shutter blade 72 causing the shutter blade 72 to pivot open, and a locking pawl 84 which can engage with a protruding locking surface 86 of a fixed shutter cover plate 88 to hold the shutter striker 46 in a cocked (clockwise rotated) position (FIGS. 13 and 15-17). The dimensions of the shutter striker 46, the shutter blade 72 and the aperture cover plate 88 are configured so that, when the locking pawl 84 of the shutter striker 46 is engaged with the locking surface 86 of the shutter cover plate 88 (FIG. 15), the striking pawl 82 of the shutter striker 46 will be positioned a short distance beyond the striking surface 78 of the shutter blade 72. If the locking pawl 84 of the shutter striker 46 is lifted above the locking surface 86 of the shutter cover plate 88, the striker spring 80 will cause the shutter striker 46 to rotate in a counterclockwise direction causing the striking pawl 82 to impact against the striking surface 78 of the shutter blade 72 causing the shutter blade 72 to open (FIG. 17). After the striking pawl 82 travels beyond the striking surface 78 of the shutter blade 72, the shutter spring 74 will return the shutter blade 72 to its closed position, resting against the shutter stop pin 76.

Referring also to FIGS. 7 and 9-11, the camera lens 26 is fixed in a lens barrel 90 which has three lens locating posts 92 protruding in a radial direction from its outer perimeter. A first control arm 94 and a second control arm 96 also protrude in a radial direction from the lens barrel 90. The control arms 94 and 96 are contacted by a lens striking arm 98 on the control plate 42 to rotate the lens barrel 90 in either a clockwise or counterclockwise direction.

The lens barrel 90 is axially centered inside a lens cam ring 100 which has three lens cam surfaces 102 on its back surface (FIG. 10). The lens cam ring 100 is prevented from rotating about the optical axis and is fixed in the axial direction with respect to the film 60.

The lens barrel 90 can be rotated about the optical axis and can move in an axial direction. A lens bracket 104 limits the allowable rotation angle of the lens barrel 90. The lens barrel 90 is biased along the optical axis away from the film 60 so that the three lens locating posts 92 are pressed against the three lens cam surfaces 102 on the back of the lens cam ring 26, determining the axial position of the lens 26 with respect to the film 60.

The three lens cam surfaces 102 on the back surface of the lens cam ring 100 are configured so that rotating the lens barrel 90 causes the axial position of the contact point between the three lens locating posts 92 and three lens cam surfaces 102 to shift, which in turn causes the lens barrel 90 and lens 26 to move axially with respect to the film 60.

Biasing force pressing the three lens locating posts 92 against the three lens cam surfaces 102 is from a sheet metal lens spring 106 with three flexible spring arms 108 that apply spring bias force against the three lens locating posts 92. The contact areas of the spring arms 108 where they press against the lens locating posts 92 are convex surfaces. This provides two stable rotated detent positions for the lens barrel 90 and therefore two stable axial focus positions designated as far focus position 110 and near focus position 112 in FIGS. 11 and 12 corresponding to the two rotation positions of lens barrel 90 since the lens locating posts 92 can be trapped on either side of the concave surfaces 108 of the spring arms 106.

Referring also to FIG. 8, an aperture blade 114 is located between the lens 26 and shutter blade 72 and can rotate about the aperture blade pivot 116 in a plane perpendicular to the optical axis. The aperture blade 114 has an aperture control arm 118 located in a radial direction above the aperture blade pivot axis 116. The aperture control arm 118 is contacted by an aperture opening surface 120 on the control plate 42 to rotate the aperture blade 114 in a counterclockwise direction. The aperture control arm 118 is contacted by an aperture closing surface 122 on the control plate 42 to rotate the aperture blade 114 in a clockwise direction.

When the aperture blade 114 is fully rotated in a clockwise direction against an aperture stop pin 124, a circular daylight aperture 126 in the aperture blade 114 is positioned so that its center is on the optical axis of the lens 26 (FIG. 8). In this position the daylight aperture 126 becomes the effective aperture of the lens 26 since it is smaller in diameter than the maximum clear aperture of the lens 26. The aperture blade 114 can be rotated in the counterclockwise direction, so that it does not intrude into the optical path of the lens 26 at all. In this position, the effective aperture is the actual maximum clear aperture of the lens 26.

A flexible aperture spring arm 128 is part of the lens spring 106 (FIG. 9). It presses against the aperture blade 114 surface creating a friction to hold the aperture blade 114 in a fixed position during film exposure, while the shutter blade 72 is open. The friction force is not sufficient to hold the aperture blade 114 from rotating against the force of a spring 130 biasing the control plate 42.

The control plate 42 is constrained to move in a linear direction perpendicular to the lens 26 optical axis. Gear teeth 42A along one surface of the control plate 42 connect the control plate 42 to the film advance motor 40 through a gear 127 of the planetary gear assembly 44.

The control plate 42 has a cocking cam surface 132 which makes contact with a roller 134 on the shutter striker 46 during forward travel of the control plate 42 (FIG. 14), causing the shutter striker 46 to rotate in a clockwise direction, about its pivot axis, to a cocked position where the locking pawl 84 of the shutter striker 46 can engage with the locking surface 86 of the aperture cover plate 88.

A wiper contact 136 is fixed to the bi-directional control plate 42 and makes sliding contact with a control PCB 138 fixed in a camera body 140. Contact pads 144, 146, and 148 are located along the surface of the control PCB 138 in the direction of travel of the wiper contact 136, making contact with the wiper contact 136 as the control plate 42 moves. Contact between the wiper contact 136 and any of the contact pads 144, 146, and 148 is detected by the camera's control electronic system 58. The three contact pads are designated as pad 1, 144, pad 2, 146, and pad 3, 148 and the position of the control plate 42 when contact is first made between the wiper contact 136 and the corresponding contact pad 1, 2, or 3 as the control plate 42 moves in the forward direction is referred to hereafter as pad 1 position 150, pad 2 position 152 or pad 3 position 154.

Figure 7:
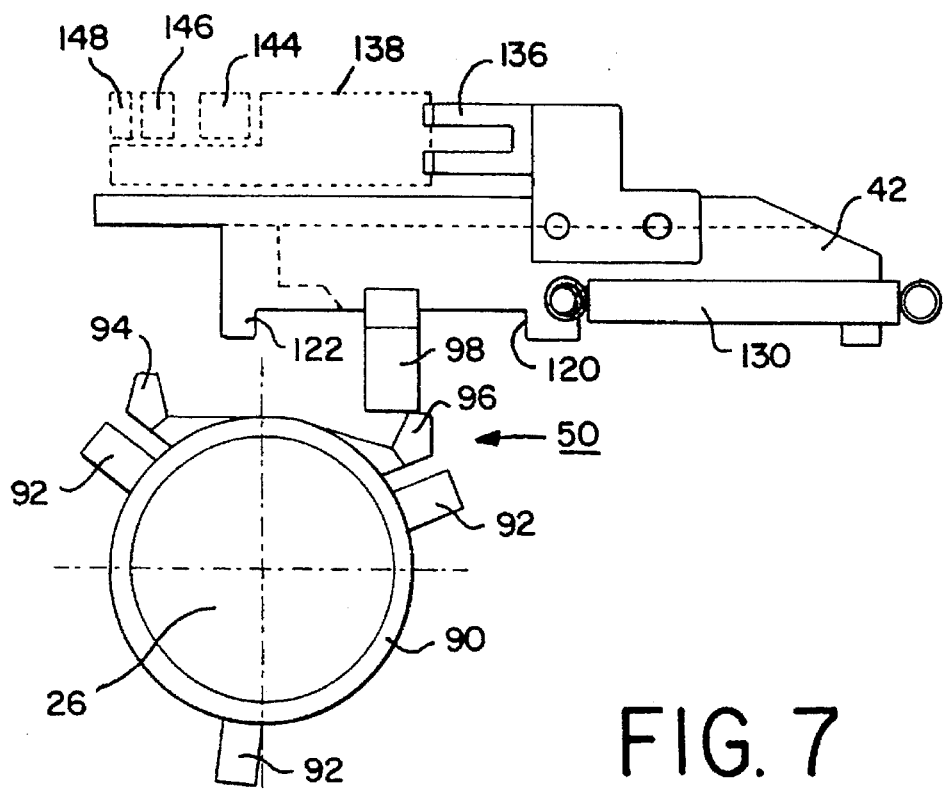
FIG. 7 is a front plan view of a lens focusing control mechanism of the camera of FIG. 1.
Figure 8:
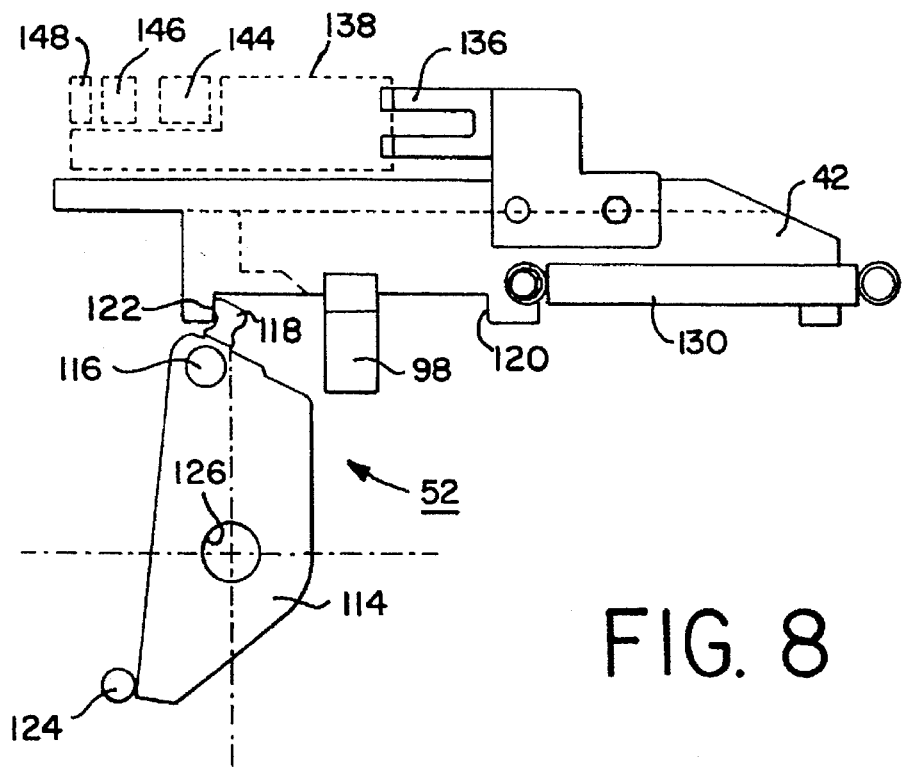
FIG. 8 is a front plan view of an aperture control mechanism of the camera of FIG. 1.
Figure 15:
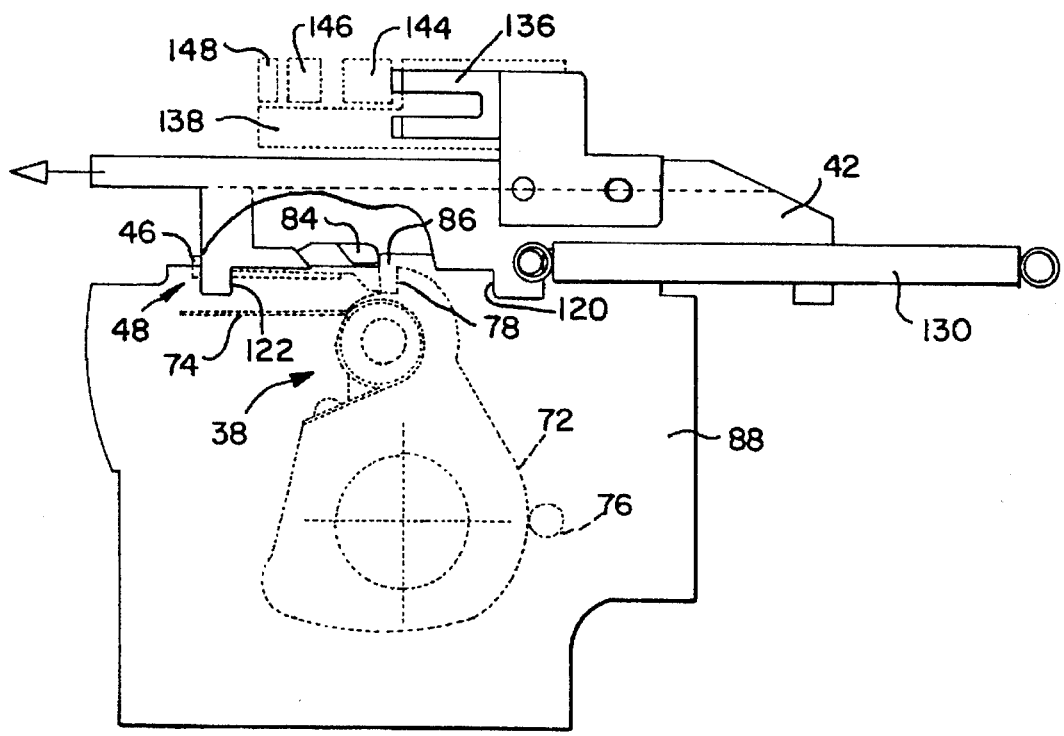
FIG. 15 is a front plan view of the shutter mechanism and the moving control element of the camera of FIG. 1 shown in a cocked position.
Figure 16:
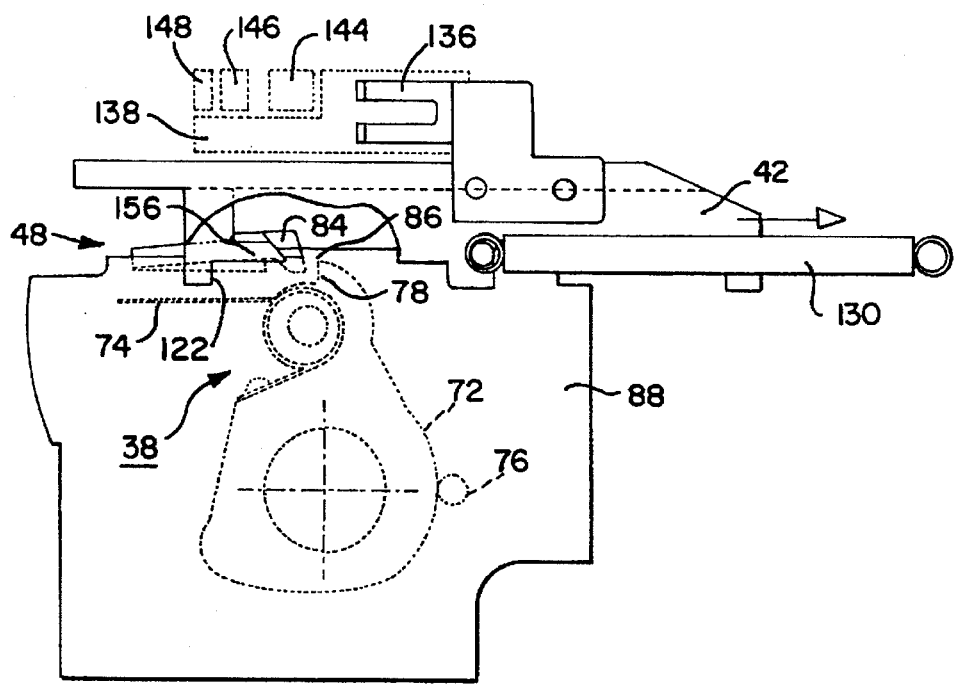
FIG. 16 is a front plan view of a shutter mechanism and the moving control element of the camera of FIG. 1 showing movement during a release shutter striker step.

The control plate 42 includes the lens striking arm 98 which is positioned to strike the lens barrel control arm 94 after sufficient forward travel of the control plate 42 from the home position of FIG. 7, causing the lens barrel 90 to rotate counterclockwise to the far focus position 110 (FIG. 12). After sufficient reverse travel of the control plate 2, the lens striking arm 98 will strike lens barrel control arm 96 causing the lens barrel 90 to rotate clockwise to the near focus position 112 (FIGS. 7 and 11).

The control plate 42 further has two control surfaces 120 and 122 to control the positioning of the aperture blade 114. When the control plate 42 has traveled sufficiently far in the forward direction from the home position of FIG. 8, the aperture control arm 118 of the aperture blade 114 is contacted by the aperture opening surface 120 on the control plate 42 to rotate the aperture blade 114 in a counterclockwise direction. When the control plate 42 has traveled sufficiently far in the reverse direction, the aperture control arm 118 of the aperture blade 114 is contacted by the aperture closing surface 122 on the control plate 42 to rotate the aperture blade 114 in a clockwise direction to the position of FIG. 7.

The control plate 42 further has a protruding shutter trigger pawl 156 (FIGS. 16 and 18) which is wedge shaped and is aligned so that during reverse motion of the control plate 42 it will strike the locking pawl 84 of the shutter striker 46, lifting it out of engagement with the locking surface 86 of the shutter cover plate 88.

Referring to FIGS. 5–6, 13–22, there is shown the shutter cocking sequence. When the user signals an intention to take a picture by depressing a camera shutter release button 157 (FIGS. 1 and 2), the camera control electronic system 58 causes the film advance motor 40 to run in the counterclockwise direction.

Figure 21:
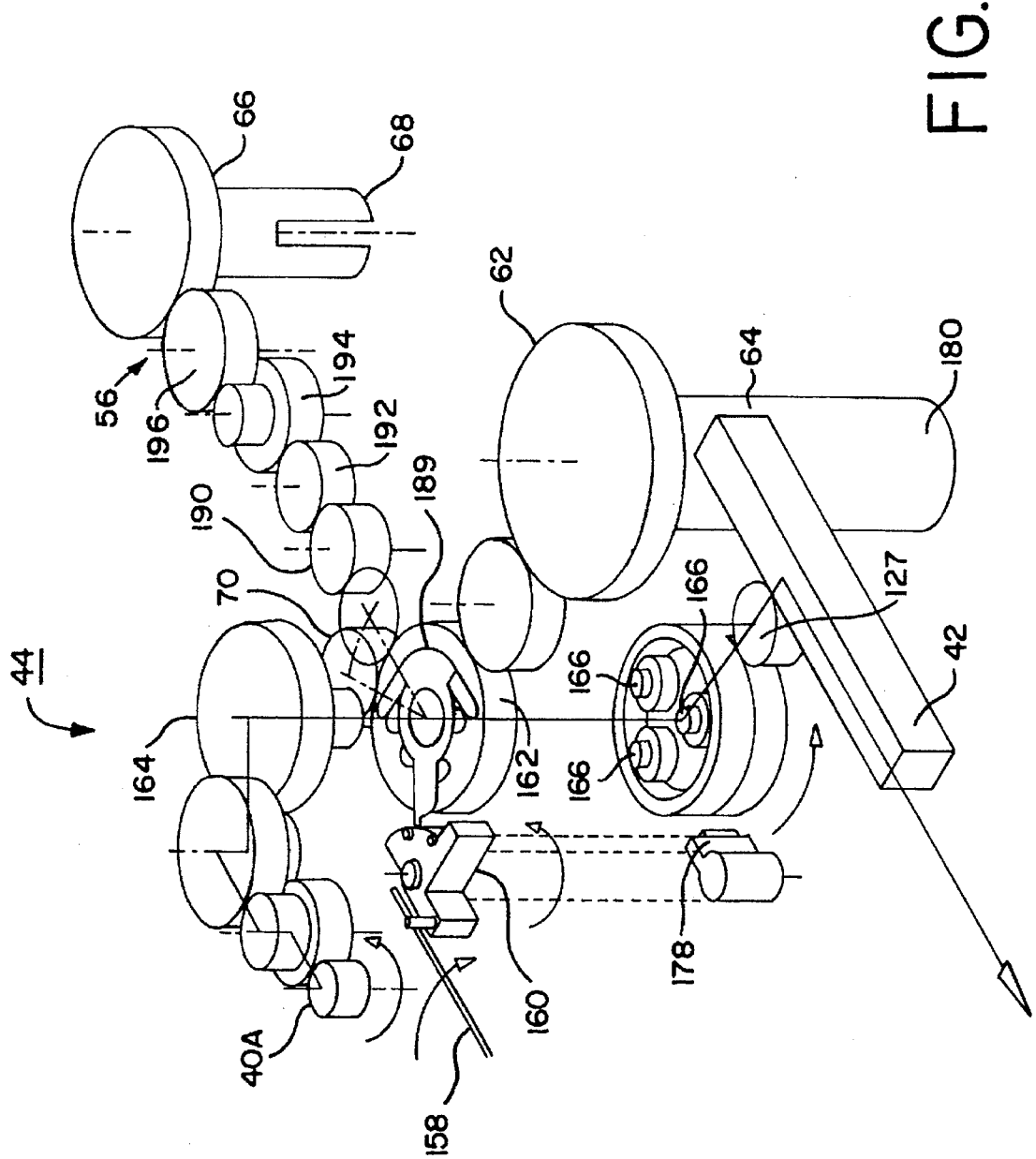
FIG. 21 is a gear train schematic illustrating the shutter cocking sequence.

Motor 40 and the motor pinion 40A run in the counterclockwise direction. Constantly applied force from a gear latch spring 158 biases a gear latch 160 in the counterclockwise direction (FIGS. 21–23). As a result of the bias provided by the gear latch spring 158, teeth on the gear latch 160 mesh with the cage gear 162, locking it so that it cannot rotate. Clockwise rotation of a sun gear 164 is converted by three planet gears 166 whose rotation axes are fixed by a cage 167 to the cage gear 162 into counterclockwise rotation of a cup gear 194, driving the control plate 42 in the forward direction through gear 127.

As the control plate 42 moves in the forward direction the cocking cam surface 132 on the control plate 42 makes contact with a roller 134 on the shutter striker 46, causing it to rotate in a clockwise direction about its pivot axis (FIGS. 13 and 14). Prior to the control plate 42 reaching the pad 1 position 150, the locking pawl 84 on the flexible arm of the shutter striker 46 will have moved over and beyond the locking surface 86 of the aperture cover plate 88 so that the shutter striker 46 will be held in the cocked (clockwise rotated) position if the control plate 42 subsequently moves sufficiently in a reverse direction to cause the cocking cam surface 132 to lose contact with the roller 134.

The control electronic system 58 selectively permits the motor 40 to drive the control plate 42 to the pad 2 and pad 3 positions, and inhibits the motor 40 from driving the control plate 42 beyond the pad 3 position 154. During forward movement of the control plate 42, the swing gear 70 is disengaged from the rewind gear 66 and the spool gear 62 is held immobile by the locked cage gear 162, so that there is no movement of film 60 in either forward or reverse direction.

As the control plate 42 moves forward from the pad 1 position 150 to the pad 2 position 152, the lens striking arm 98 of the control plate 42 strikes the lens barrel control arm 94, causing the lens barrel 90 to rotate counterclockwise from the FIG. 7 position to the far focus position 110 so that it is in the far focus position 110 when pad 2 position 152 is reached.

As the control plate 42 continues moving forward from the pad 2 position 152 to the pad 3 position 154, the lens striking arm 98 of the control plate 42 slides over the top of the lens barrel control arm 94. The lens bracket 104 prevents the lens barrel 90 from rotating further.

During the same interval of travel from the pad 2 position 152 to the pad 3 position 154, the aperture control arm 118 of the aperture blade 114 is contacted by the aperture opening surface 120 on the control plate 42 causing the aperture blade 114 to rotate in a counterclockwise direction from the FIG. 8 position and out of the optical path of the lens 26.

The position of the lens barrel 90 focus position and aperture blade 114 position for each pad position of the control plate 42 can be summarized as set forth in the following Table 1.

TABLE 1

|  | Pad 1 Position 150 | Pad 2 Position 152 | Pad 3 Position 154 |
| --- | --- | --- | --- |
| Lens Barrel Rotation | Near Focus Position 112 | Far Focus Position 110 | Far Focus Position 110 |
| Aperture Blade 114 Position | Small Aperture | Small Aperture | Large Aperture |

Prior to onset of forward travel of the control plate 42 control electronic system 58 in the camera 20 evaluates subject distance and subject illuminance level.

Subject ranging circuitry 168 (FIG. 3) is provided as part of the control electronic system 58 to detect whether subject distance is farther or closer than a preset threshold distance. Threshold distance is calculated such that subjects beyond the threshold distance will be best focused by using far focus position 110, while subjects closer than the threshold distance will be best focused by selecting near focus position 112.

Light level measuring circuitry 170 (FIG. 3) is provided to determine whether the level of ambient illuminance on the subject is above or below a threshold level. Threshold level is calculated such that when ambient illuminance is above the threshold, best picture exposure will result from using a small aperture to prevent overexposure and no electronic flash 30 is necessary. When ambient illuminance is below the threshold, best exposure will result from using an electronic flash 30 built-in to the camera 20. For pictures taken with the electronic flash 30 (ambient illuminance is less than the threshold) it can further be calculated that since subject illuminance from electronic flash 30 is inversely proportional to the square of the subject distance, at subject distances closer than the threshold distance, best exposure will result from using a small aperture, while at subject distances longer than the threshold distance, a larger aperture will give best results and allow pictures to be taken at longer subject distances without underexposure.

The combinations of aperture blade 114 and lens barrel 90 focus positions that will give best pictures for different combinations of subject distance and subject illuminance are summarized below in Table 2. Also shown are the pad positions for control plate 42 that correspond to those combinations of focus and aperture settings.

TABLE 2

| Subject Light | Subject Distance | Control Plate Position | Focus Position Selected | Aperture Selected |
|---|---|---|---|---|
| High | Close | Pad 1 144 | Near 112 | Small |
|  | Far | Pad 2 146 | Far 110 | Small |
| Low | Close | Pad 1 144 | Near 112 | Small |
|  | Far | Pad 3 148 | Far 110 | Large |

During forward travel of the control plate 42, the control electronic system 58 monitors the pad position of the control plate 42. When the desired pad position is detected, the rotation direction of motor 40 is switched to clockwise. As can be understood with reference to the gear train schematic diagrams of FIGS. 4 and 21–25, this will result in the control plate 42 being driven in the reverse direction. The aperture spring arm 128 and lens spring 106 prevent the aperture blade 114 and lens barrel 90 from further rotation in either clockwise or counterclockwise direction as the control plate 42 begins its reverse travel.

Referring to FIG. 23, there is shown the gear train schematic for the shutter triggering sequence. During the reverse travel of the control plate 42 at about the pad 1 position the shutter trigger pawl 156 will reach a position of engagement with the locking pawl 84 on the shutter striker 46, lifting it out of engagement with the locking surface 86 of the aperture cover plate 88. This allows the shutter striker 46 to rotate in a counterclockwise direction causing the striker pawl 82 to impact against the striking surface 78 of the shutter blade 72 causing the shutter blade 72 to open. After the striking pawl 82 travels beyond the striking surface 78 of the shutter blade 72, the shutter spring 74 will return the shutter blade 72 to its closed position, resting against the shutter stop pin 76.

As the control plate 42 nears the end of its possible travel in the reverse direction, the lens striking arm 98 will strike the second lens barrel control arm 96 ensuring that the lens barrel 90 remains in or is returned to the clockwise near focus position 112. Also the aperture closing surface 133 on the control plate 42 will contact the aperture control arm 118 of the aperture blade 114 ensuring that the aperture blade 114 remains in or is returned to the clockwise position resting against the aperture stop pin 124.

At the intended limit of the reverse travel of the control plate 42, a film wind stop surface 172 on the cup gear 194 impacts against a fixed position stop rib 174 in the camera body 140 (FIGS. 23 and 25), preventing further clockwise rotation of the cup gear 194. At this rotation position of the cup gear 194, a cutout 176 in the cup gear 194 becomes aligned with a gear latch locking arm 178 allowing clockwise rotation of the gear latch 160. As the motor 40 continues to run, since the cup gear 194 cannot rotate, the cage gear 162 will rotate in a counterclockwise direction forcing the gear latch 160 to rotate in a clockwise direction disengaging it from the teeth of the cage gear 162.

Figure 24:
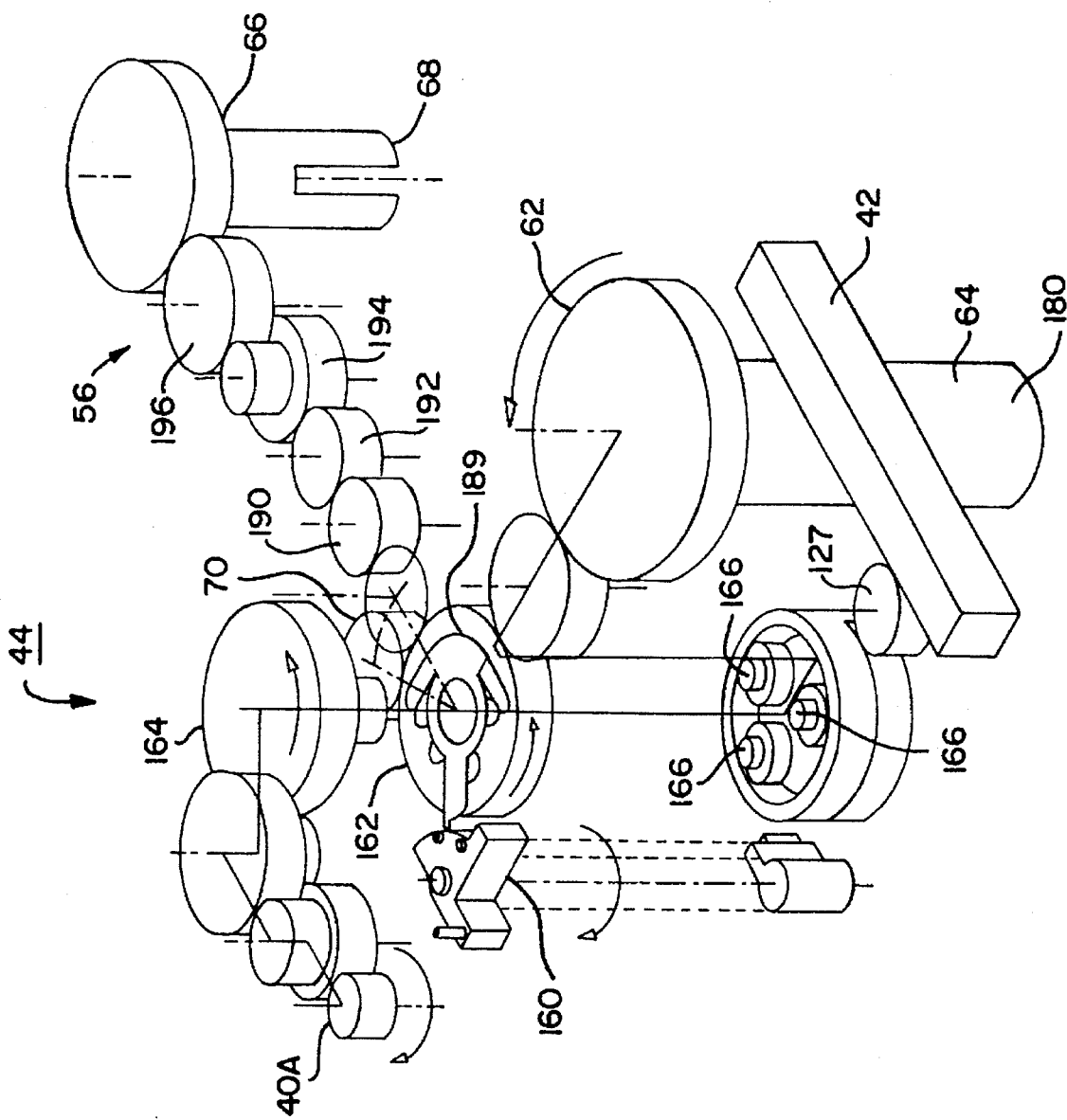
FIG. 24 is a gear train schematic illustrating a film winding sequence.
Figure 25:
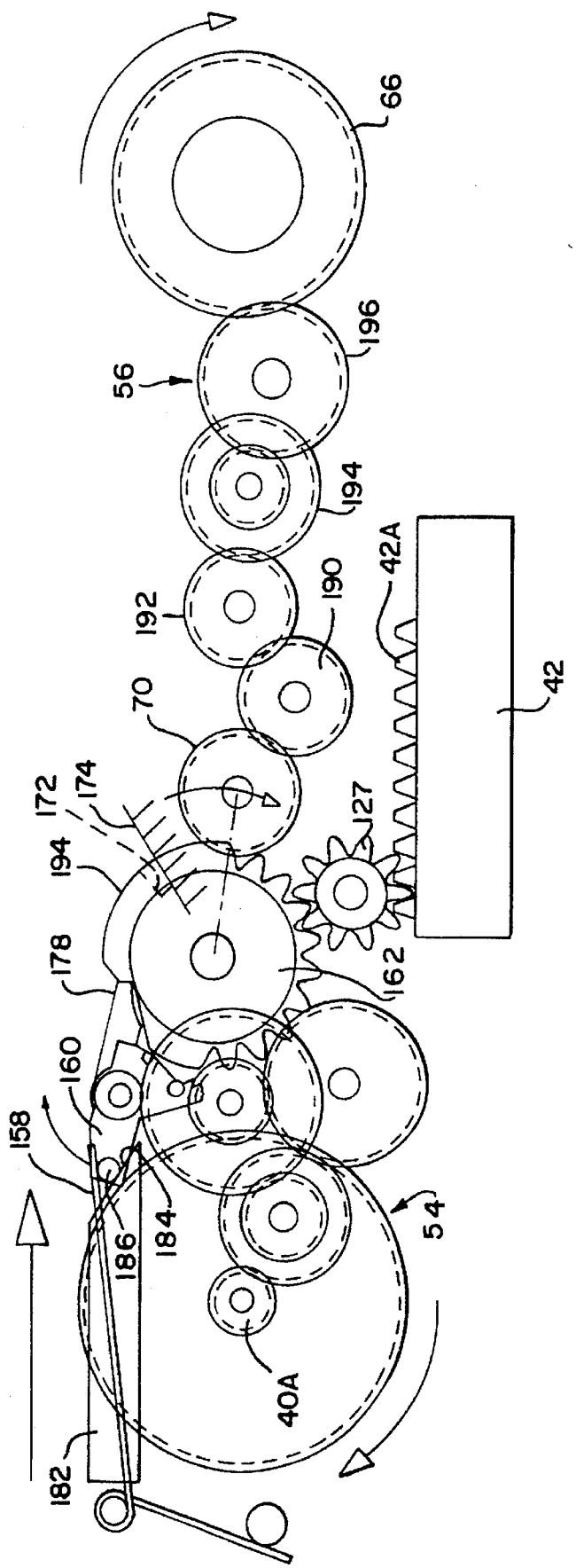
FIG. 25 is a gear train schematic top plan view illustrating a film rewinding sequence.
Figure 27A:
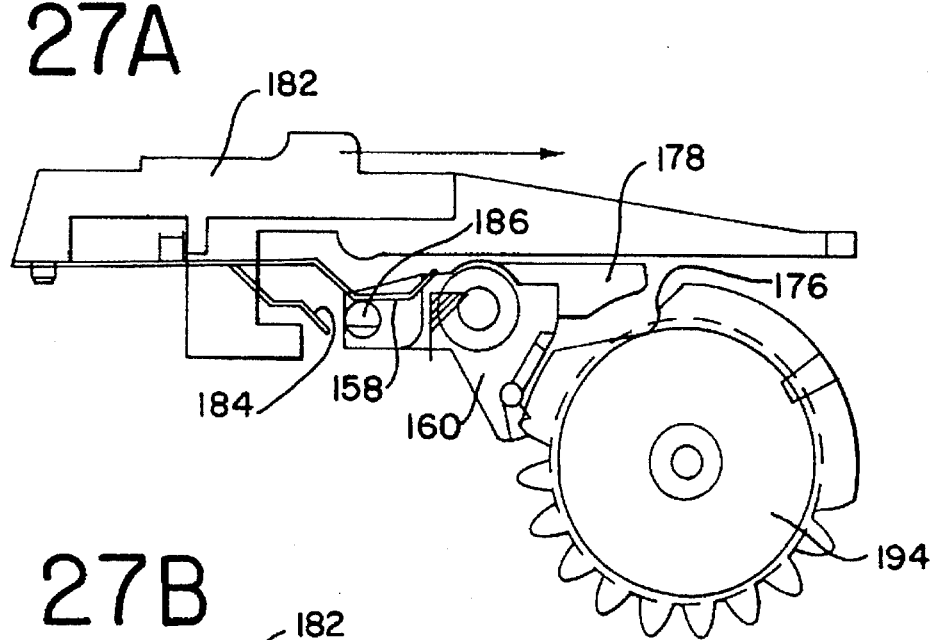
FIGS. 27A–27C are front views illustrating the interaction between a cup gear, a gear latch and a rewind switch during actuation of the rewind switch in the camera of FIG. 1.
Figure 27B:
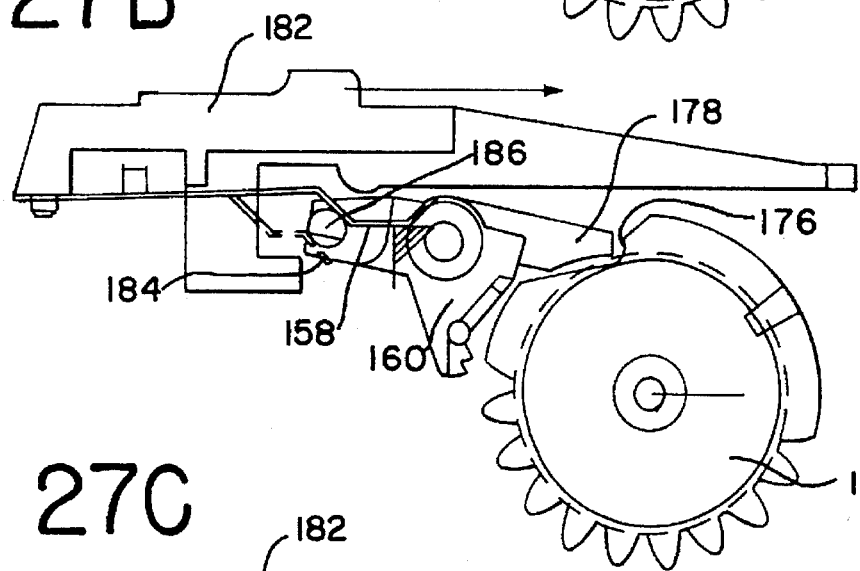
Figure 27C:
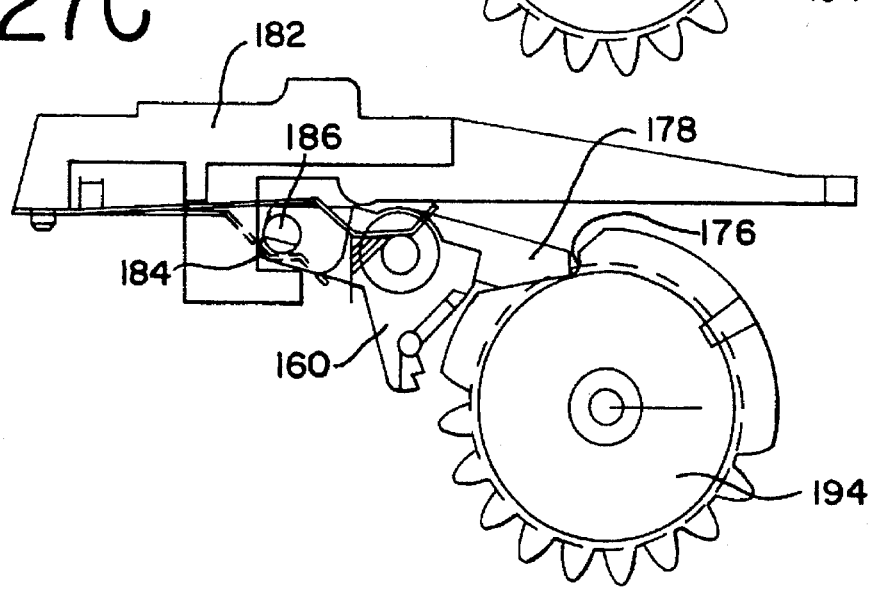

Referring to FIG. 24, there is shown a gear train schematic illustrating the film winding sequence. A film drum 180 has a spool gear 62 at one end which is coupled to the cage gear 162. Together the film drum 180 and spool gear 62 rotate in a counterclockwise direction causing the film, which is fastened to the film drum 180, to advance to a next imaging position.

Referring also to FIGS. 25 and 27A–27C, there is shown a gear train schematic illustrating the film rewinding sequence and plan views illustrating the interaction between the cup gear 194, gear latch 160 and a rewind switch 182. In order to remove film 60 from the camera 20 for processing it must be rewound off of the film drum 180, into the film cartridge 192. The rewind switch 182 is provided for initiating film rewinding. Pushing the rewind switch 182 causes a rewind cam surface 184 on the rewind switch 182 to engage with a gear latch pin 186, causing the gear latch 160 to rotate in a clockwise direction, releasing the cage gear 162. The gear latch locking arm 178 engages with the cutout 176 of the cup gear 194 preventing counterclockwise rotation of the cup gear 194.

When the rewind switch 182 is pushed to the rewind position, the control electronic system 58 will run the motor 40 in a counterclockwise direction. Since the cup gear 194 is prevented from rotating in the counterclockwise direction by the gear latch locking arm 178, the cage gear 162 rotates in the clockwise direction. The swing gear 70 is pushed into engagement with the rewind idler gear 190 and the rewind gear 66 is rotated in a clockwise direction by gears 190, 192, 194 and 196. A rewind fork 68 on the rewind gear 66 directly couples to a film cartridge effecting a rewind of the film 60 into the film cartridge. The spool gear 62 and film drum 180 rotate in a counterclockwise direction effecting unwinding of the film 60 from the film drum 180 as it rewinds into the film cartridge.

While the present invention has been described with reference to the details of the embodiments of the invention shown in the drawing, these details are not intended to limit the scope of the invention as claimed in the appended claims.

What is claimed is:

1. A camera comprising:

a camera housing;

a lens supported in said housing for transmitting a light image along a light path in said housing;

a shutter supported in said housing for movement between a normal position blocking said light path and a film exposure position spaced from said light path;

a film drive motor for advancing film along a film path behind said lens;

a striker for impacting said shutter and driving said shutter from said normal position to said exposure position;

a spring urging said striker toward said shutter;

drive means powered by said film drive motor for moving said striker to a cocked position spaced from said shutter;

a latch for holding said striker in the cocked position; and means for releasing said latch in order to expose film in said path;

said camera being characterized by:
  said drive means including a drive member movable by said drive motor in a forward direction away from a home position to a first position and in a reverse direction toward said home position;
  said drive member including first means for engaging said striker and moving said striker to said cocked position during movement in said forward direction to said first position; and
  said latch releasing means including second means on said drive member for engaging and releasing said latch during movement of said drive member in said reverse direction from said first position to said home position.

2. The camera of claim 1 further comprising trigger means for initiating an exposure sequence, and control means for controlling the direction of movement of said drive member, said control means initiating said forward movement of said driver in response to said trigger means.

3. The camera of claim 2 further comprising an exposure control element mounted along said light path and movable between positions for varying the light image transmitted through said light path, said drive member being movable from said home position in said forward direction beyond said first position to a second position, and said drive member including a third means on said drive member for engaging said exposure control member and changing its position prior to said reverse movement of said drive member.

4. The camera of claim 3, said exposure control element comprising a lens ring movable to change the focal length of said lens.

5. The camera of claim 3, said exposure control element comprising an aperture plate movable to change the aperture size of said light path.

6. The camera of claim 2 further comprising a pair of exposure control elements mounted along said light path and movable between positions for varying the light image transmitted through said light path, said drive member being movable from said home position in said forward direction beyond said first position sequentially to a second and a third position, and said drive member including a third and a fourth means on said drive member for engaging said exposure control members and sequentially changing their positions prior to said reverse movement of said drive member.

7. The camera of claim 6, said exposure control elements comprising a lens ring for changing the lens focal length and an aperture device for changing the light path aperture, said control means including means for sensing light image parameters including light intensity and subject range, said control means including position sensing means for detecting the presence of said drive member in said first, second and third positions, and means for limiting said forward motion at a selected one of said first, second and third positions in response to sensed light image parameters.

* * * * *